United States Patent
Hendou et al.

(10) Patent No.: US 10,961,836 B2
(45) Date of Patent: *Mar. 30, 2021

(54) TREATMENT OF PRODUCED WATER, PARTICULARLY OBTAINED FROM A CHEMICALLY ENHANCED OIL RECOVERY PROCESS USING VISCOSITY-INCREASING POLYMERS

(71) Applicant: Veolia Water Solutions & Technologies Support, Saint Maurice (FR)

(72) Inventors: Mouloud Hendou, Prunay en Yvelines (FR); Camille Sagne, Issy les Moulineaux (FR); Cedrick Favero, Saint Romain le Puy (FR); Ludwig Gil, Saint Etienne (FR); Christophe Rivas, Saint Romain le Puy (FR)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 428 days.

This patent is subject to a terminal disclaimer.

(21) Appl. No.: 15/518,851

(22) PCT Filed: Oct. 9, 2015

(86) PCT No.: PCT/EP2015/073491
§ 371 (c)(1),
(2) Date: Apr. 13, 2017

(87) PCT Pub. No.: WO2016/058961
PCT Pub. Date: Apr. 21, 2016

(65) Prior Publication Data
US 2017/0247999 A1    Aug. 31, 2017

Related U.S. Application Data

(60) Provisional application No. 62/063,992, filed on Oct. 15, 2014.

(51) Int. Cl.
*E21B 43/40* (2006.01)
*B01D 61/14* (2006.01)
(Continued)

(52) U.S. Cl.
CPC ............ *E21B 43/40* (2013.01); *B01D 61/147* (2013.01); *B01D 63/066* (2013.01); *B01D 65/02* (2013.01);
(Continued)

(58) Field of Classification Search
CPC .......... E21B 43/40; E21B 43/16; E21B 43/34; B01D 61/147
See application file for complete search history.

(56) References Cited

U.S. PATENT DOCUMENTS

| 5,611,931 A | 3/1997 | Liu et al. |
| 6,767,455 B2 | 7/2004 | Goldsmith |

(Continued)

FOREIGN PATENT DOCUMENTS

| CN | 101164920 A | 4/2008 |
| EP | 2096257 A1 | 9/2009 |

(Continued)

*Primary Examiner* — Crystal J Miller
(74) *Attorney, Agent, or Firm* — Coats & Bennett PLLC

(57) ABSTRACT

The present invention is concerned with the treatment of produced water, that may be obtained from a chemically enhanced oil recovery process using viscosity-increasing polymeric compounds. Said treatment comprises particularly the steps of obtaining a produced water, such as from an oil-water mixture recovered from an oil-bearing formation, wherein the produced water comprises the viscosity-increasing polymeric compounds; and, of directing the produced water to a specific filtration device, and subjecting the produced water to filtration, for obtaining a retentate stream and a permeate stream. Said process allows particularly obtaining a permeate comprising the viscosity-increasing (Continued)

polymeric compounds, said permeate being substantially free of suspended solids, free oil and emulsified oil.

27 Claims, 5 Drawing Sheets

(51) Int. Cl.
| | |
|---|---|
| *C02F 1/44* | (2006.01) |
| *B01D 63/06* | (2006.01) |
| *B01D 65/02* | (2006.01) |
| *C02F 1/40* | (2006.01) |
| *E21B 43/34* | (2006.01) |
| *E21B 43/16* | (2006.01) |
| *C09K 8/588* | (2006.01) |
| *C02F 101/32* | (2006.01) |
| *C02F 103/36* | (2006.01) |
| *B01D 71/02* | (2006.01) |
| *C02F 103/10* | (2006.01) |
| *C02F 1/68* | (2006.01) |

(52) U.S. Cl.
CPC ......... *B01D 71/025* (2013.01); *B01D 71/027* (2013.01); *C02F 1/40* (2013.01); *C02F 1/444* (2013.01); *C09K 8/588* (2013.01); *E21B 43/16* (2013.01); *E21B 43/34* (2013.01); *B01D 71/024* (2013.01); *B01D 2321/04* (2013.01); *B01D 2325/20* (2013.01); *C02F 1/68* (2013.01); *C02F 2101/32* (2013.01); *C02F 2103/10* (2013.01); *C02F 2103/365* (2013.01)

(56) References Cited

U.S. PATENT DOCUMENTS

| | | | |
|---|---|---|---|
| 7,655,075 | B2 | 2/2010 | Hofmann |
| 7,909,098 | B2 | 3/2011 | Minnich et al. |
| 8,491,680 | B2 | 7/2013 | Shaw et al. |
| 9,506,334 | B2 | 11/2016 | Higgins et al. |
| 9,663,704 | B2 | 5/2017 | Favero |
| 9,840,903 | B2 | 12/2017 | Smith |
| 2009/0056940 | A1 | 3/2009 | Minnich et al. |
| 2009/0095678 | A1 | 4/2009 | Musale et al. |
| 2013/0192836 | A1* | 8/2013 | Heng ................ C02F 9/00 166/305.1 |
| 2014/0262254 | A1* | 9/2014 | Smith ................ E21B 43/40 166/267 |
| 2014/0263057 | A1 | 9/2014 | Smith et al. |
| 2016/0221846 | A1 | 8/2016 | Smith et al. |
| 2017/0233639 | A1 | 8/2017 | Hendou et al. |

FOREIGN PATENT DOCUMENTS

| | | | |
|---|---|---|---|
| WO | 20100090889 A2 | 8/2010 | |
| WO | WO-2010090889 A2 * | 8/2010 | .......... B01D 61/147 |
| WO | 2012136064 A1 | 10/2012 | |

* cited by examiner

TREATMENT OF PRODUCED WATER, PARTICULARLY OBTAINED FROM A CHEMICALLY ENHANCED OIL RECOVERY PROCESS USING VISCOSITY-INCREASING POLYMERS

This application is a U.S. National Stage Application of PCT Application No. PCT/EP2015/073491, with an international filing date of 9 Oct. 2015. Applicant claims priority based on U.S. Provisional Patent Application No. 62/063,992 filed 15 Oct. 2014. The subject matter of these applications is incorporated herein.

FIELD OF THE INVENTION

The present invention relates to the treatment of produced water, and more particularly to a treatment process using ceramic membranes. The produced water may be obtained from a chemically enhanced oil recovery method.

BACKGROUND OF THE INVENTION

Significant portions of known oil reserves are bound in formations requiring enhanced oil recovery (EOR) techniques for effective and efficient extraction. Such reserves exist in previously untapped fields as well as in fields where traditional oil recovery has reached a practical limit.

Among EOR techniques are steam-driven recovery methods, and non steam-driven recovery methods. Steam-driven approaches include the Steam-Assisted Gravity Discharge (SAGD) technique. Non steam-driven approaches include for example water flooding and chemical flooding.

Water flooding comprises sweeping oil from oil-bearing formations by injecting large volumes of water into the formations and extracting the resulting oil-water mixture topside for processing. Generally, even after such water flooding techniques have been used on a field, at least 40% of the Original Oil In Place (OOIP) remains in the formation.

Chemical flooding has been found useful in extracting additional oil after other techniques have reached their practical limits as well as in virgin fields. Practical limits are often based on limited water supply. While chemical flooding utilizes water, the chemical treatments reduce water requirements, while increasing oil recovery. Chemical flooding techniques include for example polymer flooding.

Polymer flooding comprises using specific polymers, particularly for enhancing recovery by viscosity adjustment. Additional chemicals can be used, such as surfactants, (co)solvents, alkaline compounds, and/or stabilizing compounds. While these chemicals may be used separately in aqueous solutions, considerable experience has developed in using them in combination in aqueous solutions. Such combination treatments are sometimes referred as Alkali-Surfactant-Polymer (ASP) or Surfactant-Polymer (SP) treatments. For some fields, such treatments have been observed to result in an additional 15% to 30% extraction of the OOIP in the formation on top of water flooding.

Different polymer techniques have been developed for injection into subterranean oil fields. It is known e.g. from WO 2010/133258 an aqueous solution comprising anionic or amphoteric water soluble polymer and stabilizing agent for preventing the chemical degradation once the polymer is introduced into the injection fluid.

When extracting oil using water flooding or chemical flooding techniques, there is the need for treating the oil-water mixture extracted from the oil-bearing formations. Such treatment processes aim first at separating the oil from the water. Such treatment processes also aim at treating the produced water before being disposed of, and/or before reinjection into the injection well as injection water.

Different oil-water mixture treatment techniques have been developed.

It is known e.g. from WO2014/151641, a method for recovering oil from an oil-bearing formation and treating produced water containing an anti-scalant compound. Said method particularly comprises the step of directing the produced water through a ceramic membrane to remove oil from the produced water, and for obtaining a permeate stream and a retentate stream. Prior the membrane filtration step, said method comprises several steps, including recovering an oil-water mixture, separating oil from the oil-water mixture, deactivating the anti-scalant compound, optionally precipitating and settling solids.

It is also known e.g. from WO2014/151242, a process for recovering oil from an oil-bearing formation. Said method particularly comprises the step of directing the produced water to a ceramic membrane, for obtaining a permeate stream as well as a retentate having suspended solids, hardness compounds, free oil and emulsified oil. Prior the membrane filtration step, said method comprises recovering an oil-water mixture, separating oil from the oil-water mixture, optionally carrying out an ion exchange filtration. After the membrane filtration step, said method comprises chemically treating the permeate stream, optionally mixing a polymeric compound with the permeate stream, optionally mixing an alkali compound with the permeate stream, optionally mixing a surfactant compound with the permeate stream, optionally carrying out an ion exchange filtration on the permeate stream, and injecting the permeate stream into the oil-bearing formation.

Different types of ceramic membranes are known in the art. It is known e.g. ceramic membrane technologies from U.S. Pat. Nos. 5,611,931 and 6,767,455.

It is known techniques for recovering and treating oil-water mixtures, and produced water obtained from it. The treatment of the produced water usually shows to be challenging, particularly considering the high viscosity of the produced water. Up to now, the techniques for treating the produced waters, obtained from chemically enhanced oil recovery processes, have not shown sufficiently satisfactory. Particularly, it is not known so far conventional treatment processes for treating the produced water obtained from those processes relying on the use of viscosity-increasing polymers. Indeed, known processes have shown limited efficacy, if not at all, for separating water (in the permeate) from suspended solids, free oil, grease and emulsified oil (in the concentrate), while allowing the recycling of the polymers. Such processes do not usually allow obtaining a permeate, comprising the polymer. As a consequence, such processes do not usually allow recycling most of the polymer comprised into the produced water, for subsequent reinjection into the oil-bearing formation.

Similar challenges are faced in other technical fields, wherein there is the need for extracting fluid with a viscosity of 5 cp or more from water. For example, similar challenges are faced when there is the need for extracting biopolymers from biomass.

SUMMARY OF THE INVENTION

The present invention addresses the treatment of produced water, such as water produced in the course of the recovery of oil from oil-bearing geologic formations using an improved Chemically Enhanced Oil Recovery (CEOR) method. In particular, it is disclosed new developments in processing the produced water from chemical flooding EOR, for subsequent reuse of the water for enhanced oil recovery.

The present invention aims at providing a treatment process of produced water, and a recovery method comprising it, which does not show the drawbacks highlighted hereinbefore. One goal of the present invention is providing a treatment method, and a recovery method comprising it, which allows recycling at least a portion of the viscosity-increasing polymeric compound, comprised into the produced water.

Another goal of the present invention is providing a treatment method, and a recovery method comprising it, which comprises the treatment of the produced water using filtration means, for obtaining a permeate, in which the polymeric compound is comprised.

Another goal of the present invention is providing a treatment method, and a recovery method comprising it, wherein at least a portion of the viscosity-increasing polymeric compounds, previously injected into an oil-bearing formation, is re-injected into the oil-bearing formation. Another goal of the present invention is providing a treatment method, and a recovery method comprising it, which comprises the treatment of the produced water using filtration means, said method limiting—or even preventing—the amount of chemicals to be added to the permeate (or the solution obtained from it), before re-injection into the oil-bearing formation.

The present invention relates to a treatment process of produced water, obtained from a method using viscosity-increasing polymeric compounds, said treatment process comprising the steps of:
  obtaining an oil-water mixture;
  treating the oil-water mixture, for separating an oil product from a produced water, wherein the produced water comprises the viscosity-increasing polymeric compounds;
  directing the produced water to a filtration device, and subjecting the produced water to filtration, for obtaining a retentate stream and a permeate stream, wherein the filtration device comprises a microfiltration ceramic membrane unit having a cut-off of from about 2 μm to about 10 μm, wherein the permeate comprises said viscosity-increasing polymeric compound, and wherein the permeate is substantially free of suspended solids, free oil and emulsified oil.

The inventors have surprisingly demonstrated that the goals mentioned hereinbefore could be met by carefully selecting the type of filtration membrane to be used, and their specifics. The inventors have shown that the filtration step allows obtaining on one hand a reject stream comprising suspended solids, free oil, grease, and emulsified oil, and on the other hand a permeate stream comprising water, and chemicals such as polymers. Such permeate has shown to yield a sufficient amount of chemicals such as polymers, allowing its re-use for re-injection into the oil-bearing formation, without the need for extensively treating further the permeate, while limiting the addition of further chemicals before re-injection. Up to now, it is believed that the known methods and processes do not allow efficiently separating the emulsified oil and total suspended solids from the polymer.

Such results have been obtained by selecting a filtration means being a microfiltration ceramic membrane, and by carefully adjusting its membrane cut-off (also called "cut-off threshold"). Indeed, the inventors have shown that the ceramic membrane shall have a cut-off ranging from about 2 μm to about 10 μm, alternatively from about 2 μm to about 8 μm, alternatively from about 2 μm to about 6 μm, alternatively from about 2 μm to about 4 μm, alternatively about 3 μm.

Membranes having a lower cut-off, namely ultrafiltration membranes, are usually deemed necessary for allowing an effective separation of the oil from the water, particularly for allowing an effective separation of the emulsified oil from the water. In contrast, the skilled person is usually deterred from using microfiltration membranes, i.e. membranes with a cut-off from about 0.5 μm, as it is expected that the emulsified oil, having typically a droplet size ranging from about 0.5 μm to about 20 μm, would not be effectively separated from water, leading to the obtaining of a permeate comprising at least about 100 ppm of emulsified oil. However, the inventors have surprisingly shown that microfiltration ceramic membranes of lower cut-off, i.e. having a cut-off of less than 2 μm, particularly of 1 μm or less, are not suitable for separating efficiently the emulsified oil from the polymers. It is believed that such membranes tend to clog over time, preventing therefore the polymer to go through it, said polymers being retained into the retentate, together with the oils including the emulsified oil. In contrast, the inventors have also surprisingly shown that microfiltration ceramic membranes of higher cut-off, i.e. having a cut-off of 2 μm or more, particularly from 2 μm to about 10 μm, are suitable for separating efficiently the emulsified oil and total suspended solids from the polymers. Indeed, it has been obtained a polymer-rich permeate, only comprising traces of emulsified oil i.e. about 20 ppm or less emulsified oil. Without wishing to be bound by theory, it is believed that the emulsified oil accumulates partly into the membrane, without passing through it, and that such accumulation drives and potentiates the passage of the polymer, together with the water, through the membrane. Again, it is believed that, by using a microfiltration ceramic membrane having a cut-off ranging from about 2 μm to about 10 μm, the emulsified oil would act as another filtering layer into the membrane upon accumulation, that would potentiate the filtration of the polymer through the membrane, and therefore drives its separation from the oil.

When the present treatment process is integrated into a chemically enhanced oil recovery method, for recovering oil from an oil-bearing geologic formation, it allows using at least a portion of the permeate obtained after the filtration step, for injection into the oil-bearing formation, either by direct injection or indirect injection. This allows therefore re-injecting the viscosity-increasing polymeric compounds previously injected into the oil-bearing formation, and comprised into the extracted oil-water mixture extracted, then the separated produced water, then the filtered permeate.

Again, when integrated into a chemically enhanced oil recovery method, the present water treatment, and recovery method comprising it, allows therefore recycling—at least in part—the viscosity-increasing polymeric compounds previously injected into the oil-bearing formation. Consequently, it allows reducing the amount of new (or fresh or non-recycled) viscosity-increasing polymeric compounds needed for injection into the oil-bearing formation. It allows also adjusting the viscosity of the aqueous solution to be injected into the oil-bearing formation.

The present treatment process has shown several advantages, which are general or specific to some applications.

Without wishing to be exhaustive, it is believed that this process allows limiting, or even avoiding, the membrane fouling. Indeed, as the viscosity-increasing polymeric compounds pass through the microfiltration ceramic membrane (together with the permeate), the polymer concentration and the viscosity of the fluid to be filtered is limited.

When integrated in water treatment methods, this process may be used as a pretreatment, e.g. before carrying out a further membrane filtration step. This would help purifying the viscosity-increasing polymeric compounds, before their potential reuse.

When recovering oil, this process would assist in driving up the efficacy of oil treatment and recovery.

Alternatively, this process may be used for extracting biopolymers from the biomass, and more generally any other fluid with a viscosity higher than 5 cp.

After carrying out the filtration step, further compounds may be added to the permeate. The further compounds may be selected from the group consisting of further viscosity increasing polymeric compounds, surfactants, solvents, alkaline compounds, stabilizing agents, and mixtures thereof.

The produced water may be subjected to ceramic membrane filtration, at a pressure of from about $0.5 \times 10^5$ to about $5 \times 10^5$ Pa. Such pressure is referred as transmembrane pressure.

The produced water may be subjected to ceramic membrane filtration, at a temperature of from about 25° C. to about 110° C., preferentially from about 40° C. to about 100° C.

The ceramic membrane filtration step may be carried out under a continuous feed with the produced water.

During the ceramic membrane filtration step, a backwash of the ceramic membrane may be carried out at regular intervals.

The reject stream (or a portion of it) may be disposed of. Alternatively or in parallel, the reject stream (or a portion of it) may be recycled upstream the ceramic membrane filtration device into the produced water (e.g. an oil-water mixture, when recovering oil from an oil-bearing geologic formation), for being further subjected to a ceramic membrane filtration step. Alternatively or in parallel, the reject stream (or a portion of it) may be further treated using a treatment unit, other that the ceramic membrane filtration device.

The ceramic membrane filtration unit may comprise a structure of at least one monolith segments of porous material, and optionally a porous membrane.

The ceramic membrane filtration unit may be contained in a housing.

The permeate may be post-treated. The post-treatment may consist in the dilution of the permeate with an aqueous media.

The viscosity-increasing polymeric compound may be a water-soluble polymer; alternatively the viscosity-increasing polymeric compound may be selected from the group consisting of natural water-soluble polymers, semi-synthetic water-soluble polymers, synthetic water-soluble polymers, or mixtures thereof; alternatively the viscosity-increasing polymeric compound may be a synthetic water-soluble polymer.

The viscosity-increasing polymeric compound may be obtained by polymerization of monomers selected from the group consisting of non-ionic monomers, anionic monomers, optionally cationic monomers, optionally monomers having a hydrophobic character, and mixtures thereof.

The viscosity-increasing polymeric compound may be selected from the group consisting of non ionic polymeric compounds, anionic polymeric compounds, or mixtures therefore; alternatively the viscosity-increasing polymeric compound may be an anionic polymeric compound; alternatively; the anionic polymeric compounds may have an anionicity ranging from about 10 to about 100 mol %.

When recovering oil from an oil-bearing geologic formation, the permeate, comprising the viscosity increasing polymeric compound, may be injected directly into the oil-bearing. Alternatively, the permeate, comprising the viscosity increasing polymeric compound, may be mixed to an aqueous solution, prior injection into the oil-bearing formation.

The permeate may be post-treated, prior injection into the oil-bearing formation.

Further compounds may be added to the permeate, prior injection into the oil-bearing formation.

DETAILED DESCRIPTION

As used herein, the term "oil" means any type of oil, namely light oil, heavy oil, and/or bituminous oil.

As used herein, the term "water-oil mixture" means the mixture, which is recovered directly from the oil-bearing formation.

As used herein, the term "produced water" means the product, obtained from the water-oil mixture, and which is separated from the oil.

As used herein, the terms "injection water", "flood water" "injection stream", and "injection fluid" may be used interchangeably, and correspond to the aqueous solution to be injected into the oil-bearing formation.

As used herein, the terms "retentate (stream)", "concentrate (stream)", and "reject (stream)" may be used interchangeably.

As used herein, the term "substantially free" means less than about 200 ppm, alternatively less than about 100 ppm, alternatively less than about 60 ppm, alternatively less than about 40 ppm, alternatively it means "free".

As used here, the acronym "CEOR" means "chemically enhanced oil recovery", which is a term conventionally used in the field of oil extraction.

Figure 1:
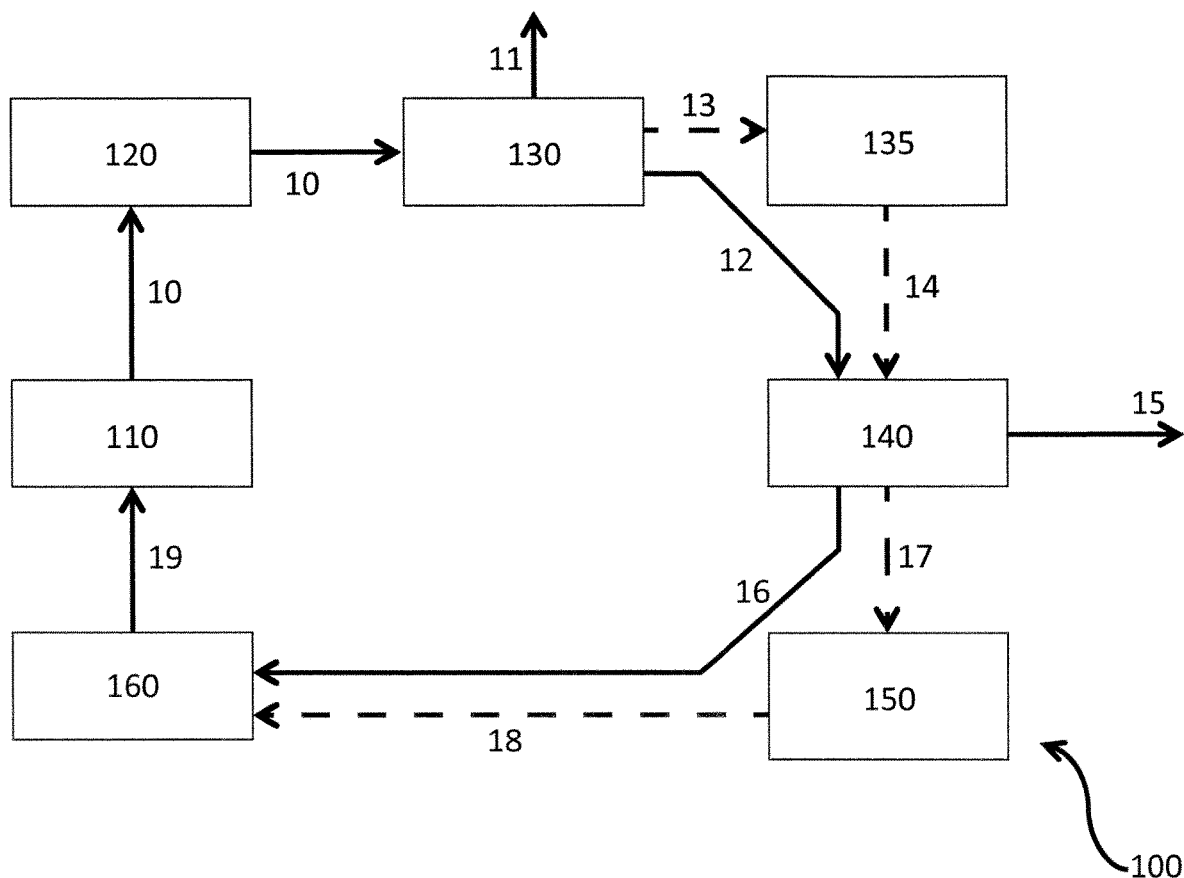
FIG. 1—A schematic representation of an oil recovery method comprising the treatment process according to the invention, including optional steps FIG. 2—A schematic representation of an oil recovery method comprising the treatment process using a pilot unit (close loop)

In the process 100 shown in FIG. 1, wherein the treatment process is integrated in an oil recovery method, the produced water 12, comprising viscosity increasing polymeric compounds, is directed from the oil-water separator 130 to a filtration device 140 comprising a ceramic membrane (not shown), wherein it is subjected to a filtration step. From this filtration step, it is obtained a permeate stream 16, comprising the viscosity increasing polymeric compounds, and a reject stream (or concentrate) 15. Prior filtration by the filtration device 140, the produced water 13 may optionally be directed from the oil-water separator 130 to a pre-treatment unit 135, for obtaining a pre-treated produced water 14 (optional pre-treatment step). The pre-treated produced water 14 may then be directed from the pre-treatment unit 135 to the filtration device 140.

The produced water 12 (or 13) may be obtained from an oil-water mixture 10, which is recovered from an oil-bearing formation 110. Indeed, an oil-water mixture 10 may be recovered from an oil-bearing formation 110, via a production well 120, which is in fluid communication with the oil-bearing formation 110. The oil-water mixture 10 may be directed from the production well 120 to an oil-water separator 130, wherein it would be subjected to an oil-water separation step. From this separation step, it would be obtained an oil product 11, which is withdrawn, and a produced water 12.

The permeate 16 may be directed from the filtration device to the injection well 160, for injection to the oil-bearing formation 110, as an injection water 19. Prior injection into the oil-bearing formation 110 via the injection well 160, the permeate 17 may optionally be directed from the filtration device 140 to a post-treatment unit 150, for obtaining a post-treated permeate 18 (optional post-treatment step). The post-treated permeate 18 may then be directed from the post-treatment unit 150 to the injection well 160, for injection to the oil-bearing formation 110.

Viscosity-Increasing Polymeric Compounds

The aqueous solution, also called "injection water", comprises viscosity-increasing polymeric compounds (herein as "polymers"). These polymers aim at enhancing recovery by viscosity adjustment. Indeed, such polymers, when added to the aqueous solution to be injected, tend to increase its viscosity, which improves the mobility ratio of the aqueous solution relative to oil. Increased viscosity of the aqueous solution may reduce viscous fingering, where thinner aqueous solution and thicker oil results in "finger" of aqueous solution moving without entraining the oil in the flow of aqueous solution. Increasing the viscosity of the aqueous solution to be injected reduces this "fingering" phenomenon and results in enhanced oil recovery from the formation. The polymer is typically added until its concentration in the aqueous solution to be injected increases the viscosity up to the oil viscosity in the oil-bearing formation. This tends to achieve a mobility ratio of closer to 1 to enable better sweep of the oil from the rock with the water by avoiding the fingering through the oil pockets. There may also be formation-related viscosity issues, such as permeability of the formation. Typically, the oil-water mobility ratio is the controlling factor on the polymer addition when formation permeability ranges between about 10 mD to about 10,000 mD, alternatively from 50 mD and about 10,000 mD.

Viscosity-increasing polymeric compounds may be water-soluble polymers; alternatively they may be selected from the group consisting of natural water-soluble polymers, semi-synthetic water-soluble polymers, synthetic water-soluble polymers, or mixtures thereof.

Natural water-soluble polymers may be selected from the group consisting of xanthan gum, guar gum, scleroglucan, schizophillan, cellulosic derivatives such as carboxymethyl cellulose, or mixtures thereof.

In a particular embodiment, the viscosity-increasing polymeric compound may be a synthetic, water-soluble polymer. Synthetic, water-soluble polymers may be obtained by the polymerization of non-ionic monomers and anionic monomers.

Non-ionic monomers may be selected from the group consisting of acrylamide, methacrylamide, N-mono derivatives of acrylamide, N-mono derivatives of methacrylamide, N,N derivatives of acrylamide, N,N derivatives of methacrylamide, acrylic esters, methacrylic esters, and mixtures thereof. Preferably, the non-ionic monomer is acrylamide.

Anionic monomers may be selected from the group consisting of monomers having a carboxylic function, monomers having a sulfonic acid function, monomers having a phosphonic acid function, their salts thereof, and their mixtures thereof; alternatively from the group consisting of acrylic acid, acrylamide tertio butyl sulfonic acid (ATBS), their salts thereof, and mixtures thereof. Salts may be selected from the group consisting of alkaline salts, alkaline earth salts, ammonium salts, and mixtures thereof.

In addition of non-ionic monomers and anionic monomers, further monomers may be used, including cationic monomers, monomers having a hydrophobic characters, and/or alternative monomers. Water-soluble polymer may be obtained by the polymerization of at least one non-ionic monomer, at least one anionic monomer, optionally at least one cationic monomer, and/or optionally at least one monomer having a hydrophobic character in a range comprised between about 0.001 mol % and about 1 mol %.

The cationic monomers may be selected from the group consisting of dimethylaminoethyl acrylate (DMAEA) quaternized or salified, dimethylaminoethyl methacrylate (DMAEMA) quaternized or salified, diallyldimethyl ammonium chloride (DADMAC), acrylamidopropyl trimethylammonium chloride (APTAC), methacrylamidopropyl trimethylammonium chloride (MAPTAC), and mixtures thereof.

The monomer having a hydrophobic character may be selected from the group consisting of (meth)acrylic acid esters having an alkyl, arylalkyl or ethoxylated chain; derivatives of (meth)acrylamide having an alkyl, arylalkyl or dialkyl chain; cationic allyl derivatives; anionic or cationic hydrophobic (meth)acryloyl derivatives; anionic or cationic monomers derivatives of (meth)acrylamide bearing a hydrophobic chain, and mixtures thereof.

Further monomers—alternative to non-ionic monomers, anionic monomers, cationic monomers, or monomers having a hydrophobic character—may be selected for example from N-Vinyl Pyrrolidone (NVP), AcryloyMorpholine (ACMO), or mixtures thereof.

The viscosity-increasing polymeric compounds may be linear or structured. By "structured", it is meant a polymer not only consisting of one linear chain of moieties (i.e. polymerized monomers), but instead a polymer having the form of a star, a comb, or a polymer having pending groups of pending chains on the side of the main chain.

The polymerization may be carried out using any suitable polymerization technique well known in the art. Suitable techniques include techniques comprising a polymerization step selected from the group consisting of solution polymerization, suspension polymerization, gel polymerization, precipitation polymerization, emulsion polymerization (aqueous or inverse) or micellar polymerization, preferably selected from the group consisting of inverse emulsion polymerization or gel polymerization.

In a preferred embodiment, the polymerization step is a free radical polymerization. By "free radical polymerization", it is meant a polymerization step carried out in the presence of ultraviolet irradiations, azoic initiators, redox initiators, thermal initiators, and combination thereof. As an alternative, controlled radical polymerization (CRP), or template polymerization are also possible.

If necessary, the polymerization step may be followed by an isolation step, for example by spray-drying or precipitation, in order to obtain a polymer powder. For example spray drying technics are disclosed in "Spraydrying handbook", K. Masters.

The polymerization is generally a free radical polymerization preferably by inverse emulsion polymerization or gel polymerization. By free radical polymerization, we include free radical polymerization by means of U.V. azoic, redox or thermal initiators and also Controlled Radical Polymerization (CRP) techniques or template polymerization techniques.

The viscosity-increasing polymeric compound may be non ionic or anionic; preferably viscosity-increasing polymeric compound having an anionicity ranging from about 10 mol % to about 100 mol %. Such range of anionicity is of interest for allowing potentiating the water viscosity potential for a long time, particularly via intermolecular bonds especially when the aqueous media is a brine The polymer may have a molecular weight ranging from about 1 to about 30 MDa, preferably from about 7 to about 25 MDa.

Produced Water

The produced water comprises the viscosity-increasing polymeric compounds.

The produced water may have a viscosity ranging from about 1.5 mPa·s to about 500 mPa·s, alternatively from about 3 mPa·s to about 200 mPa·s, alternatively from about 3 mPa·s to about 100 mPa·s.

The produced water may have a temperature ranging from about 5° C. to about 110° C., preferably from about 40° C. to about 100° C.

The produced water may comprise from about 50 to about 5000 ppm, preferably from about 100 to about 2000 ppm, more preferably from about 200 to about 1000 ppm of polymers, per total of the produced water.

Filtration Step

The present treatment process also comprises the step of directing the produced water to a filtration device, and subjecting the produced water to filtration, for obtaining a retentate stream and the permeate stream. This step is called herein "filtration step".

Ceramic Membrane

The filtration device comprises a microfiltration ceramic membrane (also designated as microfiltration ceramic membrane unit, called herein as "filtration unit"). Upon filtration, it is obtained a retentate stream and a permeate stream.

The filtration unit has a cut-off of from about 2 µm to about 10 µm, alternatively from about 2 µm to about 8 µm, alternatively from about 2 µm to about 6 µm, alternatively from about 2 µm to about 4 µm, alternatively about 3 µm. Such specific cut-off has shown advantageous in that it allows obtaining a permeate stream comprising the viscosity-increasing polymeric compounds. Such specific cut-off also allows obtaining a permeate being substantially free of suspended solids, free oil and/or emulsified oil.

The permeate, obtained upon filtration, comprises the viscosity-increasing compounds.

The permeate, obtained upon filtration, is substantially free of suspended solids, free oil and emulsified oil.

The filtration unit may comprise a structure of at least one monolith segment of porous material. The porous material, forming the monolith segments, is preferably ceramic. The ceramic porous material may be selected from the group consisting of SiC.

Each monolith defines a plurality of passageways. The filtration unit may comprise a single monolith segment. Alternatively, the filtration unit may comprise an assembly of monolith segments.

The monolith segments may have a cross-section being circular, square, hexagonal, rectangular, triangular, or any other suitable cross-section.

The filtration unit may also comprise a porous membrane. The porous membrane may be applied to the walls of the monolith segment passageways. When a porous membrane is present, the porous monolith acts as the porous membrane support. When present, the porous membrane is preferably ceramic. The ceramic porous membrane may be selected from the group consisting of SiC, $TiO_2$, $Al_2O_3$.

Alternatively, the filtration unit may not comprise a porous membrane.

The filtration device may comprise a housing, wherein the filtration unit is contained in a housing. The housing may also comprise a permeate filtration zone. When present, the permeate filtration zone may be contained in the space between filtration unit and the housing.

The produced water may be subjected to ceramic membrane filtration at a pressure from about $0.5 \times 10^5$ to about $5 \times 10^5$ Pa.

The produced water may be subjected to ceramic membrane filtration at a temperature ranging from about 25° C. to about 110° C.

The ceramic membrane filtration may be carried out under a continuous feed.

During the ceramic membrane filtration step, the ceramic membrane may be backwashed.

Permeate

The permeate, which is obtained upon filtration of the produced water, comprises the viscosity increasing polymeric compounds. The separation step, then the filtration step have allowed therefore recycling the viscosity increasing polymeric compounds, previously injected into the oil-bearing formation, into the permeate.

The permeate further comprise an aqueous media, preferably water.

Pre-Treatment Step

After the separation step and prior to the filtration step, the present treatment process may further comprise a pre-treatment 135, using conventional means. Such conventional means may be selected from:
  mechanical degradation or chemical degradation to reduce water containing viscosity;
  coalescence, flotation, desemulsification, hydrocyclone to increase oil droplet size; and/or,
  self-cleaning filtration set up to reduce the total suspended solid load in the stream.

Post-Treatment Step

The present treatment process may also comprise the step of post-treating at least a portion of the permeate. This step is called herein "post-treatment step". It is generated therefore a treated permeate stream (also called post-treated permeate stream).

The post-treatment step may consist in the addition of an aqueous media to the permeate—in such case the post-treatment step consists in a dilution step. The aqueous media may be water. When carrying out this step, the treated permeate may also be referred as the diluted permeate.

The dilution ratio permeate:aqueous media may range from about 1:100 to about 10:1, preferably from about 1:10 to about 5:1.

In the post-treatment step, at least about 10%, alternatively at least about 25%, alternatively at least about 50%, alternatively at least about 60%, alternatively at least about 70%, alternatively at least about 80%, alternatively at least about 90%, alternatively about 100%, of the permeate obtained upon filtration is treated.

The post-treatment step may consist in the combination of a viscosity-increasing polymeric compound and the permeate. The purpose is to increase the viscosity of the permeate and re-establish an appropriate viscosity for an injection. The type of viscosity-increasing polymeric compound is the same as previously described. The amount of viscosity-increasing polymeric compound may be comprised from about 100 ppm to about 10000 ppm, alternatively from about 200 ppm to about 5000 ppm, alternatively from about 500 ppm to about 4000 ppm of viscosity-increasing polymeric compounds, per total of the permeate.

The combination may consist in the addition of a viscosity-increasing polymeric compound in solution form, dispersion form or particle form to the permeate. Generally, the amount of viscosity-increasing polymeric compound added in the permeate, which contains recycled viscosity-increasing polymeric compound, is lower than the amount of viscosity-increasing polymeric compound contain in the initial injection solution.

When the viscosity-increasing polymeric compound is in particle form, it may be dissolved in an aqueous media in a dispersing device. The permeate, or a diluted version, may be used as the aqueous media which is used in polymer dispersing device to prepare an aqueous solution of viscosity-increasing polymeric compound. An example of dispersing device is the Polymer Slicing Unit (PSU) described in the document U.S. Pat. No. 8,186,871, and which permits the preparation of concentrated polymeric aqueous solution with viscosity-increasing polymeric compound in powder form.

The post-treatment step may also consist by a polishing step such as filtration through a nut shell filter or equivalent means.

Enhancement Step

After the ceramic membrane filtration step, the permeate (or a portion of it) may be subjected to an enhancement step. An enhanced permeate stream would be generated. The enhancement step may be carried out by adding suitable further compounds.

Further compounds may be added to the permeate, prior injection into the oil-bearing formation. The further compounds, to be added, may be selected from the group consisting of further viscosity-increasing polymeric compounds, surfactants, alkaline compounds, scale inhibitors, chelatants, stabilizers, oxygen scavengers or mixtures thereof. These compounds have been described hereinbefore.

When the treatment process is integrated in a recovery method, the enhancement step may be implemented before the reinjection step.

There may be the need for adding further viscosity-increasing polymeric compounds to the permeate, and/or to the aqueous solution. Such further addition may be needed if:

(1) part of the polymeric compounds, present in the permeate, have been thermally, chemically and/or mechanically degraded during the sweep of the oil-bearing formation; and/or (2) the viscosity of the aqueous solution and/or the permeate, to be injected, needs to be adjusted.

Aqueous Solution

The aqueous solution to be injected comprises viscosity-increasing polymeric compounds and an aqueous carrier. The aqueous carrier may be water.

The aqueous solution may have a Brookfield viscosity ranging from about 1.5 mPa·s to about 600 mPa·s, alternatively from about 5 mPa·s to about 300 mPa·s. The Brookfield viscosity is made with a Brookfield viscometer at 25° C. with the appropriate spindle.

The aqueous solution may comprise from about 100 ppm to about 10000 ppm, alternatively from about 200 ppm to about 5000 ppm, alternatively from about 500 ppm to about 4000 ppm of viscosity-increasing polymeric compounds, per total of the aqueous solution.

The aqueous solution may comprise further compounds. The further compounds may be selected from the group consisting on alkaline agents, surfactants, stabilizing compounds, and mixtures thereof.

Alkaline Agents

The alkaline agent may be selected from the group consisting in alkali metal hydroxides, ammonium hydroxides, carbonates, bicarbonates, and mixtures thereof. The alkaline agent may be, for example, sodium carbonate.

Surfactants

The surfactants may be selected from the group consisting in anionic surfactants, zwitterionic surfactants, and mixtures thereof; alternatively from the group consisting of alkyl sulfates, alkyl ether sulfates, arylalkyl sulfates, arylalkyl ether sulfates, alkyl sulfonates, alkyl ether sulfonates, arylalkyl sulfonates, arylalkyl ether sulfonates, alkyl phosphates, alkyl ether phosphates, arylalkyl phosphates, arylalkyl ether phosphates, alkyl phosphonates, alkyl ether phosphonates, arylalkyl phosphonates, arylalkyl ether phosphonates, alkyl carboxylates, alkyl ether carboxylates, arylalkyl carboxylates, arylalkyl ether carboxylates, the alkyl polyethers, arylalkyl polyethers, and mixtures thereof.

Presently, the term "alkyl" is understood as being a hydrocarbon group, saturated or unsaturated, having from 6 to 24 carbon atoms, branched or unbranched, linear or optionally comprising one or more cyclic units, which can optionally comprise one or more heteroatoms (O, N, S). An arylalkyl group is defined as an alkyl group as defined above comprising one or more aromatic rings, said aromatic rings optionally comprising one or more heteroatoms (O, N, S).

Stabilizing Compounds

The stabilizing compounds (stabilizing agents) may be compounds for suitably protecting the viscosity-increasing polymeric compounds, for example against thermal, chemical and/or mechanical degradation. Examples of suitable stabilizing agents are provided in the PCT patent application WO2010/133258, which is incorporated herein by reference.

CEOR Method

The treatment process of the present invention may be integrated within a recovery method, for example a chemically enhanced oil recovery (CEOR) method. Such method may be of use for recovering of oil from oil-bearing geologic formations.

Said chemically enhanced oil recovery method may be implemented by using viscosity-increasing polymeric compounds. Said method, using viscosity-increasing polymeric compounds may comprise the step of:
- injecting an aqueous solution into an oil-bearing formation, said aqueous solution comprising viscosity increasing polymeric compounds;
- recovering an oil-water mixture obtained from said oil-bearing formation;
- treating the oil-water mixture, for separating an oil product from a produced water, wherein the produced water comprises the viscosity-increasing polymeric compounds;
- directing the produced water to a filtration device, and subjecting the produced water to filtration, for obtaining a retentate stream and a permeate stream, wherein the filtration device comprises a microfiltration ceramic membrane unit having a cut-off of from about 2 µm to about 10 µm, wherein the permeate comprises said viscosity-increasing polymeric compound, and wherein the permeate is substantially free of suspended solids, free oil and emulsified oil;
- injecting the permeate into the oil-bearing formation.

Injection Step

The CEOR method may comprise the step of injecting an aqueous solution into an oil-bearing formation. This step is called herein "injection step".

Recovery Step

The CEOR method may also comprise the step of recovering an oil-water mixture obtained from the oil-bearing formation. This step is called herein "recovery step". The oil-water mixture comprises oil, which is present originally in the oil-bearing formation, and the aqueous solution, which is injected into the oil-bearing formation.

Separation Step

The CEOR method may also comprise the step of treating the oil-water mixture, for separating an oil product from a produced water. This step is called herein "separation step". The separation step may be carried our using any suitable systems, e.g. systems comprising separation tanks (such as those without plates and/or those with inclined-plate separators), hydrocyclone, system using air sparged flotation, systems using dissolved air flotation, systems comprising wall nut shell filters, systems relying on coalescence package and filters.

Reinjection Step

The CEOR method may also comprise the step of injecting the permeate into the oil-bearing formation. This step is called herein "the reinjection step".

The permeate may be injected into the same injection well, into which the aqueous solution was previously injected (cf. injection step). Alternatively, the permeate may be injected into different injection wells.

Depending on the implementation contemplated, the permeate may be injected directly into the oil-bearing formation (direct injection); an enhanced permeate may be injected, after having subjected the permeate to further treatments (enhancement step, then direct step); the permeate may be mixed with a "fresh" aqueous solution, prior to injection (mixing step, then injection step); the enhanced permeate may be mixed with a "fresh" aqueous solution, prior injection (enhancement step, then mixing step, then injection step); the permeate is mixed with fresh aqueous solution, then enhanced, then injected Direct Injection The treated permeate may be injected directly into the oil-bearing formation. In this embodiment, the aqueous solution, to be injected, consists therefore in the permeate.

As detailed hereinafter, whenever any enhancement step is carried out prior injection, the enhanced permeate may be injected directly into the oil-bearing formation.

Mixing Step and/or Co-Injection Step

Prior injection into the oil-bearing, alternatively to the direct injection, the permeate may be mixed to the aqueous solution. In this embodiment, after having mixed the permeate with the aqueous solution, the resulting mixture would be injected into the oil-bearing formation.

As detailed hereinafter, whenever any enhancement step is carried out prior injection, the enhanced permeate may be mixed to the aqueous solution.

CEOR Methods

CEOR methods encompass any method, in which the permeate is injected into the oil-bearing formation. The CEOR method may be selected from the group consisting of enhanced oil recovery process, reservoir stimulation process, sacrificial adsorption process, or drag reduction process in water flooding.

The enhanced oil recovery (EOR) method involves a continuous and prolonged injection of a solution, comprising a polymer, in order to sweep the reservoir from an injection well to a production well. The aim is to treat not a zone of the reservoir but the totality thereof in order to recover as much oil as possible. To that end it is necessary to inject a much greater volume of aqueous solution, which is generally from 50% to 500%, or even more, of the pore volume. At the production well or wells there is recovered an aqueous, oily and sometimes gaseous mixture.

The reservoir stimulation method encompasses conformance process, mobility control, plugging process, said process being characterized by injections of a solution, comprising a polymer, which are limited in terms of volume in order to create a localized phenomenon in the reservoir, namely for conformance, a sealing of zones of high permeability, for "water shut off", blocking zones where undesired water enters the subterranean formation. The injections are generally carried out either by an injection well or by a production well over quite short periods of time of several days, and generally less than one month, and with volumes representing less than 5% of the pore volume of the reservoir. The pore volume corresponds to the volume that is not occupied by the rock in the reservoir, which provides a correlation with the permeable zone. Generally, the viscosity-increasing polymeric compound is crosslinked with a crosslinker (organic or metallic ions) before being injected into the oil-bearing formation, or in-situ. The resulting crosslinked polymer forms a gel.

The sacrificial adsorption method comprises the step of a chemically enhanced oil recovery, in which the permeate is injected into the oil-bearing formation to adsorb the polymeric compound onto the inner surface of reservoir. The polymeric compound is adsorbed onto the surface and acts as a sacrificial agent. This step is generally made at the beginning of a CEOR process with a low polymeric compound concentration injection fluid and allows the reduction the adsorption of viscosity-increasing polymeric compound during the next injection.

The drag reduction process during water-flooding is also considered as a chemically enhanced oil recovery process because it implies the injection of the permeate. The polymeric compound acts as a drag reducer and decreases the force (injection pressure) needed to inject the fluid into the oil-bearing formation. Generally the drag reduction process implies the use of a low polymeric compound concentration injection fluid.

EXAMPLES

Different types of ceramic membranes have been compared in order to assess their suitability and their efficacy for separating the polymer from the oil. Particularly, it has been assessed their suitability and their efficacy for obtaining a reject stream comprising particularly the suspended solids, free oil, grease, emulsified oil; and a permeate stream comprising the polymer.

Example 1—Polymer Concentration Comparison

It has been tested the impact of the concentration of the polymers into the aqueous solution on their permeability through different ceramic membranes.

The following polymers have been tested:
poly(acrylamide-co-sodium acrylate), with a molecular weight of 7 MDa (herein as "7 MDa polymer"),
poly(acrylamide-co-sodium acrylate), with a molecular weight of 15 MDa (herein as "15 MDa polymer").

Four different concentrations of polymer have been tested, namely 200 ppm, 600 ppm, 600 ppm degraded (except for the test of the 7 MDa polymer on the uncoated SiC monolith membrane), and 1000 ppm. When applicable, the polymer is degraded by subjecting it to a high pressure, then dropping the pressure.

Figure 4:
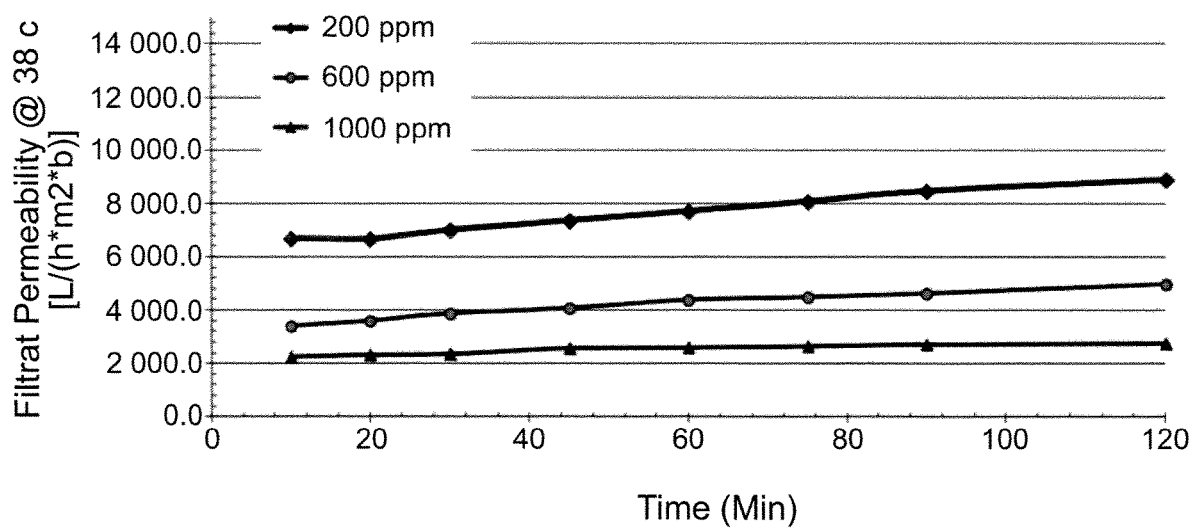
FIG. 4—Graphic representation of filtrate permeability over time on an uncoated SiC monolith ceramic membrane of water-polymer mixture comprising a poly(acrylamide-co-sodium acrylate) polymer (MW=7 MDa)
Figure 5:
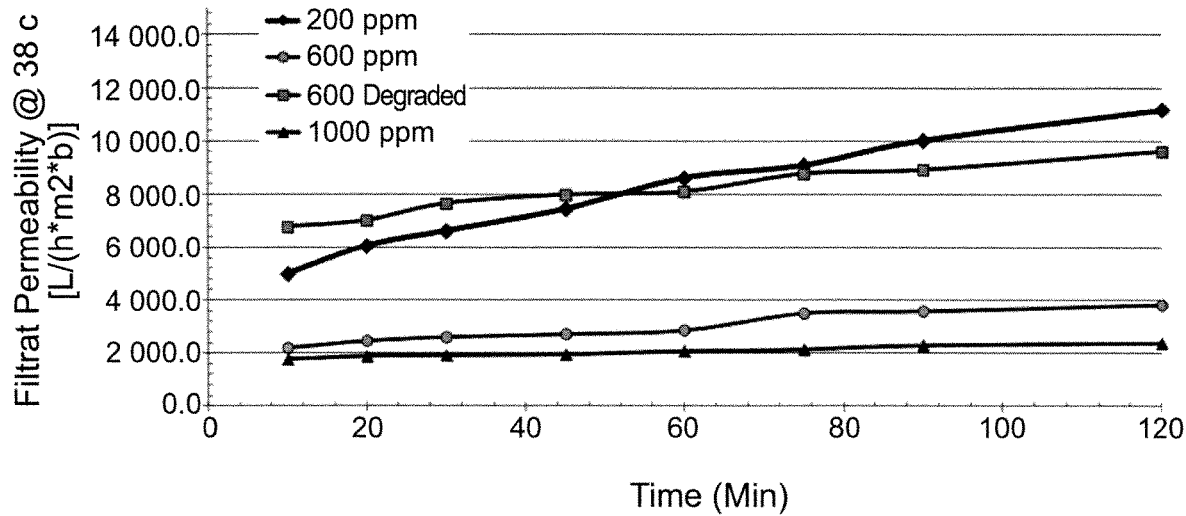
FIG. 5—Graphic representation of filtrate permeability over time on an uncoated SiC monolith ceramic membrane of a water-polymer mixture comprising a poly(acrylamide-co-sodium acrylate) polymer (MW=15 MDa)

The following ceramic membranes have been tested:
uncoated SiC monolith ceramic membrane, having a membrane cut-off of from about 5 to about 10 µm;
standard $TiO_2$ microfiltration ceramic membrane, having a membrane cut-off of about 0.1 µm;

The filtrations have been carried out under the following experimental conditions:
Brine: 4830 TDS, 115 TDS divalent, 1310 TDS carbonate
Temperature: 38° C.
TMP: 1 bar
Concentrate velocity: 3 m/s The filtration permeability over time of 7 MDa polymer on the uncoated SiC monolith ceramic membrane is shown on FIG. 4. The filtration permeability over time of 15 MDa polymer on the uncoated SiC monolith ceramic membrane is shown on FIG. 5.

From these experiments, it is shown that the tested uncoated SiC monolith ceramic membrane is very permeable to both 7 MDa and 15 MDa polymers, that the permeability decreases as the polymer concentration increases, and that the permeability increases over time.

Except for the difference of scale as per the permeability due to the difference in cut-off, similar observations are made with the tested standard $TiO_2$ MF ceramic membrane, i.e. it is shown that the permeability decreases as the polymer concentration increases. It has also been shown that, for a same concentration of polymer, the permeability of the polymer is higher, when the polymer is degraded.

On both membranes, it has been shown that the permeability tends to increase over time. Without wishing to be bound by theory, it is believed that the membrane is not completely wet (wetted) at the beginning of the experiments, and that permeability is increasing as the membrane is getting totally wet; that the polymer is degrading slowly because of the recirculation of both the permeate and the concentrate in the feed tank; and that the concentration of the polymer is decreasing as a the test progresses.

Example 2—Oil Retention on Ceramic Membrane (Close Loop)

It has been tested the efficacy of the permeability of the ceramic membrane, depending on the non-continuous addition of oil.

Figure 2:
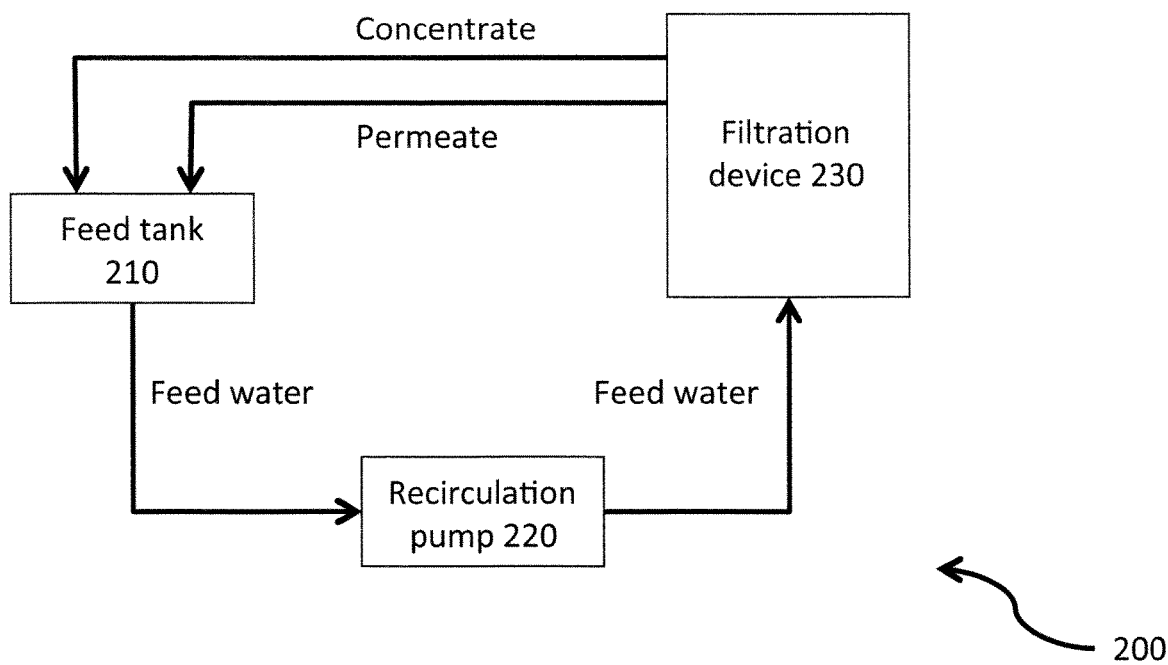

A schematic representation of the pilot unit is shown on FIG. 2. In the pilot unit 200 shown in FIG. 2, the feed water is directed from the feed tank 210, via a recirculation pump 220, to the filtration device 230, wherein it is subjected to filtration. From this filtration step, it is obtained a permeate stream and a reject stream, which are both fed into the feed tank 210. A transmembrane pressure is applied to the filtration device (not shown).

The following polymer has been tested:
poly(acrylamide-co-sodium acrylate), with a molecular weight of 7 MDa (herein as "7 MDa polymer") at a concentration of 600 ppm The following ceramic membranes have been tested:
uncoated SiC monolith ceramic membrane, having a membrane cut-off of from about 5 to about 10 µm The filtrations have been carried out under the following experimental conditions:
Brine: 4830 TDS, 115 TDS divalent, 1310 TDS carbonate
Temperature: 38° C.
TMP: 1 bar
Concentrate velocity: 3 m/s
the filtration is run for about 500 min;
a backflush is carried out between about 100 min and about 350 min for 0.75 s every 6 min;
Crude oil is regularly added in the feed tank.

Figure 6:
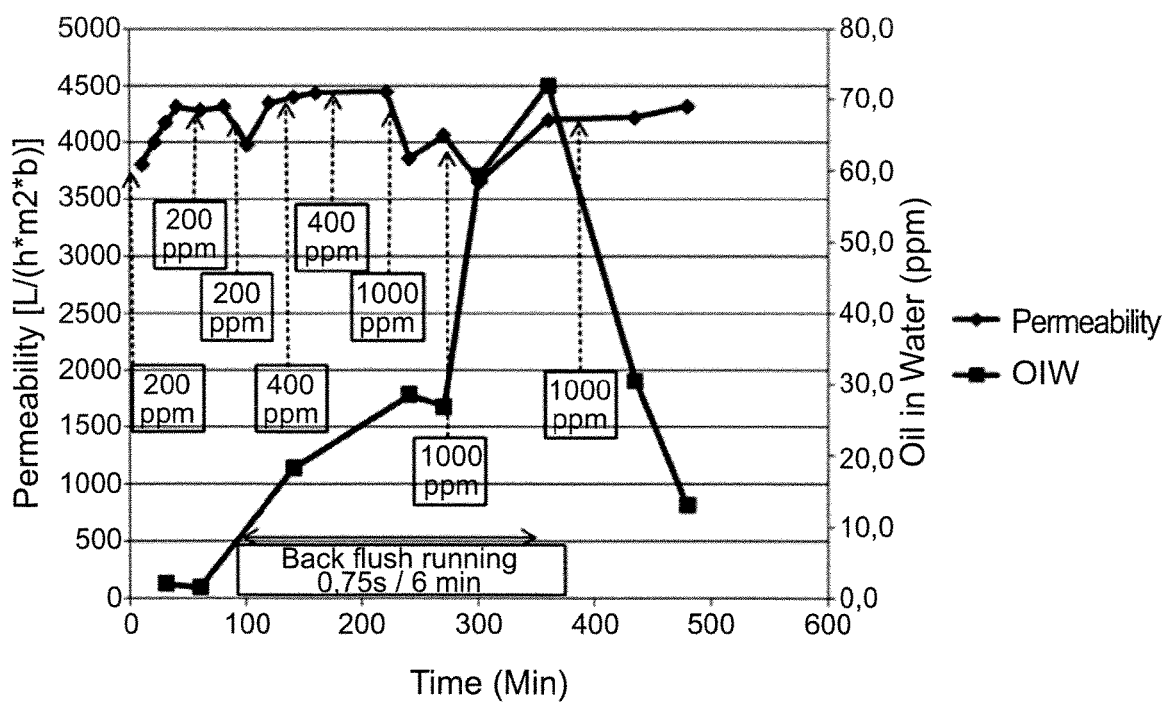
FIG. 6—Graphic representation of filtrate permeability/oil retention over time on an uncoated SiC monolith ceramic membrane of an oil-water mixture comprising a 600 ppm polymer (MW 7 MDa)

The filtration permeability over time is shown on FIG. 6.

It has been shown that the permeability is stable over time (between about 3500 L/(h·m²·b) and about 4500 L/(h·m²·b)).

It has also been shown that the oil content is very low at the beginning, then reaches about 70 ppm at the maximum. It is apparent that this maximum concentration has been reached after starting the backpulse. In contrast, when the backpulse is stopped, the oil concentration decreases again to reach a value of about 13 ppm.

Without willing to be bound by theory, it is believed that the oil is absorbed by the membrane leading to a decrease of the oil concentration in the feed tank, while the polymer is passing through the membrane at a rate of about 90% to about 100%.

A Cleaning In Place (CIP) is carried out after each test, using a cleaning solution (surfactant solution with a neutral pH). The CIP is allows cleaning the ceramic membrane, particularly by removing from the ceramic membrane the compounds and materials accumulated onto the monolith. The CIP allows restoring the permeability at an equivalent level of a new monolith (filtration device).

Example 3—Oil Retention on Ceramic Membrane (Continuous Feed)

It has been tested the efficacy of the permeability of the ceramic membrane, through a continuous extraction of the permeate and the concentrate.

Figure 3:
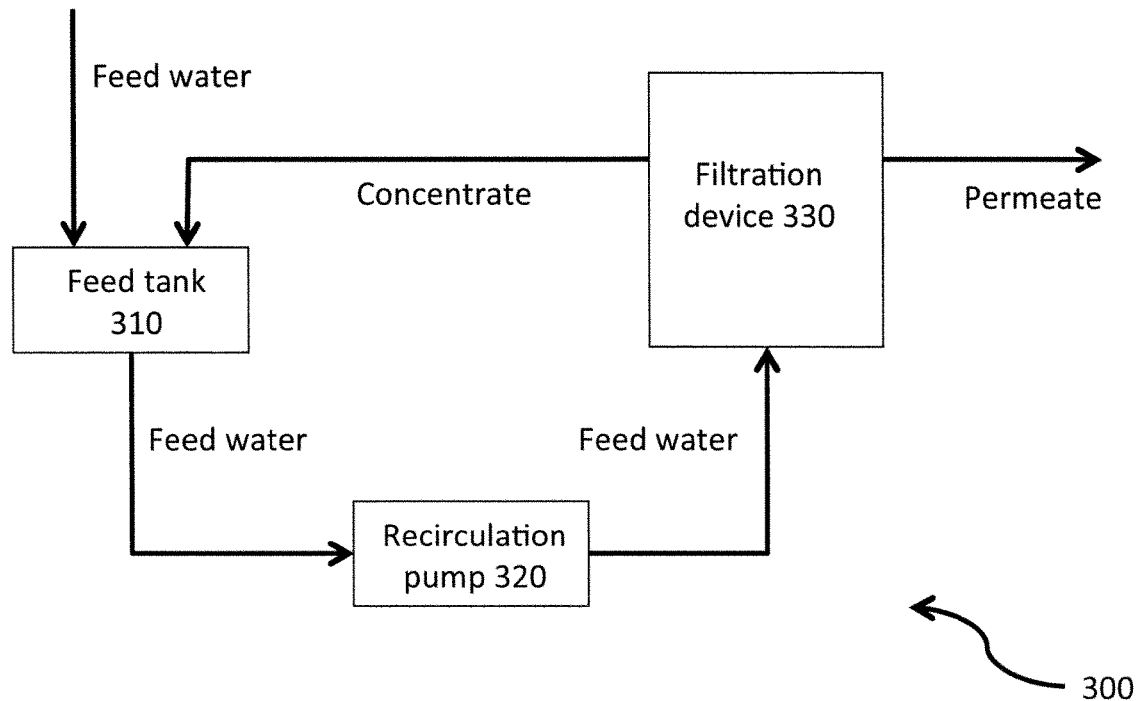
FIG. 3—A schematic representation of an oil recovery method comprising the treatment process using a pilot unit (continuous feed)

A schematic representation of the pilot unit is shown on FIG. 3. In the pilot unit 300 shown in FIG. 3, the feed water is directed to the feed tank 310. The feed water is then continuously directed from the feed tank 310, via a recirculation pump 320, to the filtration device 330, wherein it is subjected to filtration. From this filtration step, it is obtained a permeate stream and a reject stream. The reject stream is directed back from the filtration device to the feed tank 310. A transmembrane pressure is applied to the filtration device (not shown).

Figure 7:
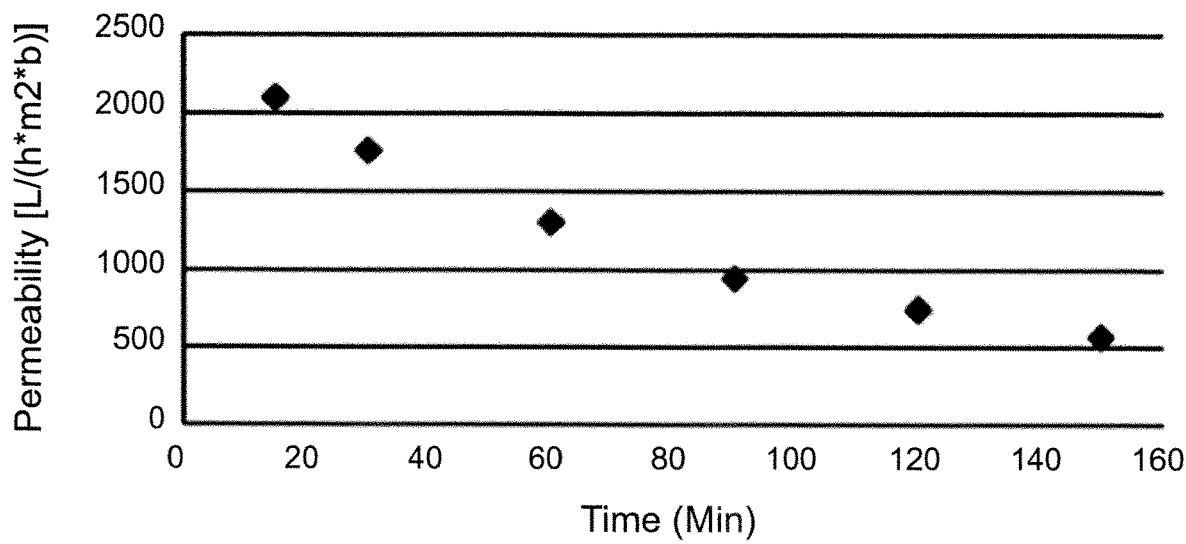
FIG. 7—Graphic representation of filtrate permeability over time on an uncoated SiC monolith ceramic membrane of an oil-water mixture comprising a poly(acrylamide-co-sodium acrylate) polymer (MW=7 MDa) at a concentration of 600 ppm, oil at 1000 ppm, TSS at 50 ppm FIG. 8—Graphic representation of filtrate permeability over time on an uncoated SiC monolith ceramic membrane of an oil-water mixture comprising a poly(acrylamide-co-sodium acrylate) polymer (MW=7 MDa) at a concentration of 600 ppm, oil at 1000 ppm, in the absence of TSS FIG. 9—Graphic representation of filtrate permeability over time on an uncoated SiC monolith ceramic membrane of produced water comprising a polymer at a concentration of 150 ppm, TSS at a concentration of 20 to 50 ppm

The following compounds have been tested:
7 MDa polymer at a concentration of 600 ppm;
Oil at a concentration of 1000 ppm;
Total Suspended Solids at a concentration of 50 ppm and with a particle size of about 100 µm to about 150 µm The following ceramic membranes have been tested:
uncoated SiC monolith ceramic membrane, having a membrane cut-off of from about 5 to about 10 µm The filtrations have been carried out under the following experimental conditions:
Brine: 4830 TDS, 115 TDS divalent, 1310 TDS carbonate
TMP: 1 bar
Concentrate velocity: 3 m/s
Temperature of 25° C.;
Continuous extraction of the permeate and the concentrate;
Regular addition of a fresh solution into the feed tank;

The filtration permeability over time is shown on FIG. 7.

It has been shown that the permeability is decreasing over time, although there is no concentration of the feed during the test. Without willing to be bound by theory, it is believed that such decrease can be due to the accumulation of oil into the membrane, in combination with a lower temperature than for the tests reported hereinbefore, which impairs the passage of the water through the membrane, and therefore impairs the passage of the polymers through the membrane.

The permeability can be recovered after cleaning with various cleaning solutions, such surfactant solution with a neutral pH, citric acid and sodium hypochlorite (not shown).

Example 4—Oil Retention on Ceramic Membrane (Continuous Feed)

It has been tested the efficacy of the permeability of the ceramic membrane, through a continuous extraction of the permeate and the concentrate. A schematic representation of the pilot unit is shown on FIG. 3

Figure 8:
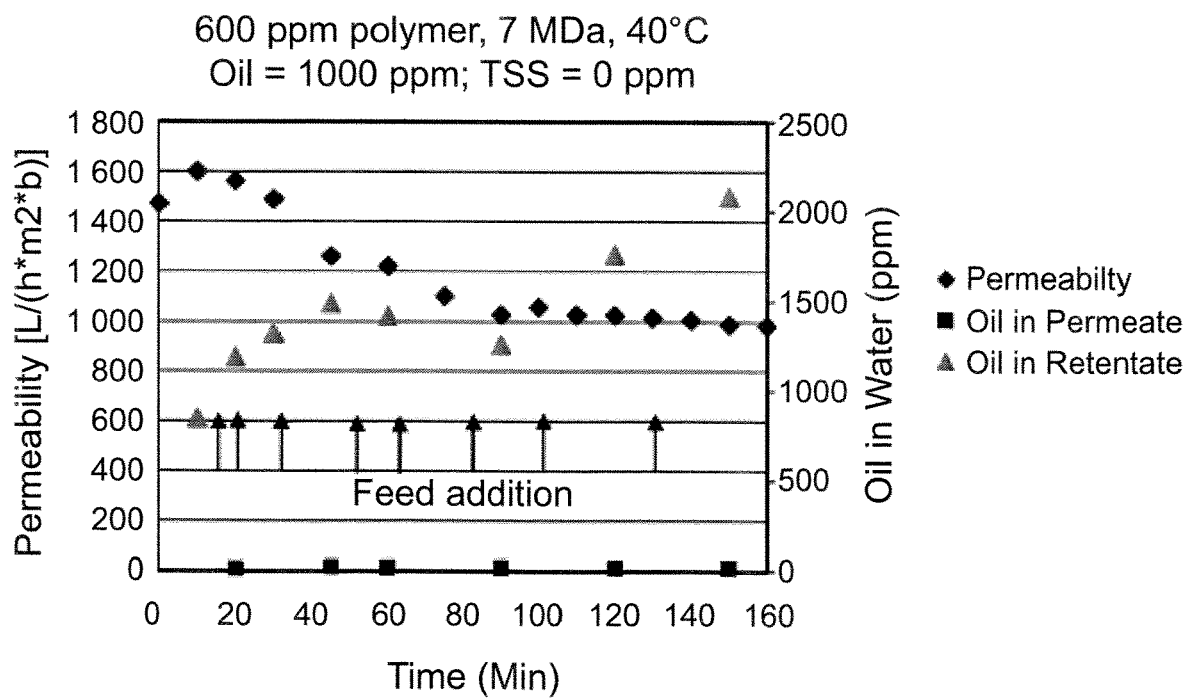

The following compounds has been tested:
7 MDa polymer at a concentration of 600 ppm;
Oil at a concentration of 1000 ppm;
No TSS The following ceramic membranes have been tested:
uncoated SiC monolith ceramic membrane, having a membrane cut-off of from about 5 to about 10 µm The filtrations have been carried out under the following experimental conditions:
Brine: 4830 TDS, 115 TDS divalent, 1310 TDS carbonate
TMP: 1 bar
Concentrate velocity: 3 m/s
Temperature of 40° C.
Continuous extraction of the permeate and the concentrate;
Regular addition of a fresh solution into the feed tank at times 13, 21, 32, 48, 65, 85, 105 and 130 min The filtration permeability over time is shown on FIG. 8.

It has been shown that the permeability is decreasing slowly during the first part of the test, while it remains stable at a lower value during the second part of the test. Without willing to be bound by theory, it is believed that, during the first part of the test, oil is accumulating inside the membranes leading to a decrease of permeability. However, after some time, a steady state is reached wherein the accumulated oil is creating another filtering layer with a constant permeability. The oil concentration in the permeate appears to be stable, at a value of around 20 ppm. In contrast, the oil concentration in the retentate is not stable, which is believed to be due to the addition of feed batch by batch in the feed tank. An alternative or complementary explanation could be that the increase in concentration can also be due to the accumulation and release of oil by the membrane.

The permeability can be recovered after cleaning twice the membrane device with a surfactant solution with a neutral pH (not shown).

Example 5—Treatment of Real Produced Water (Closed Loop)

It has been tested the efficacy of the permeability of the ceramic membrane, through a recirculation loop of the permeate and the concentrate. A schematic representation of the pilot unit is shown on FIG. 2.

The produced water with the following composition has been tested:
a polymer at a concentration of 150 ppm;
TSS at a concentration of about 20 to 50 ppm;

The following ceramic membranes have been tested:
uncoated SiC monolith ceramic membrane, having a membrane cut-off of from about 5 to about 10 µm The filtrations have been carried out under the following experimental conditions:
TMP: 1 bar
Concentrate velocity: 3 m/s
Temperature of 35° C.
Recirculation of the permeate and the concentrate (closed loop);
For one of the trails, operation in dead-end mode for 5 min at 19, 30, 47, 58 min.

Figure 9:
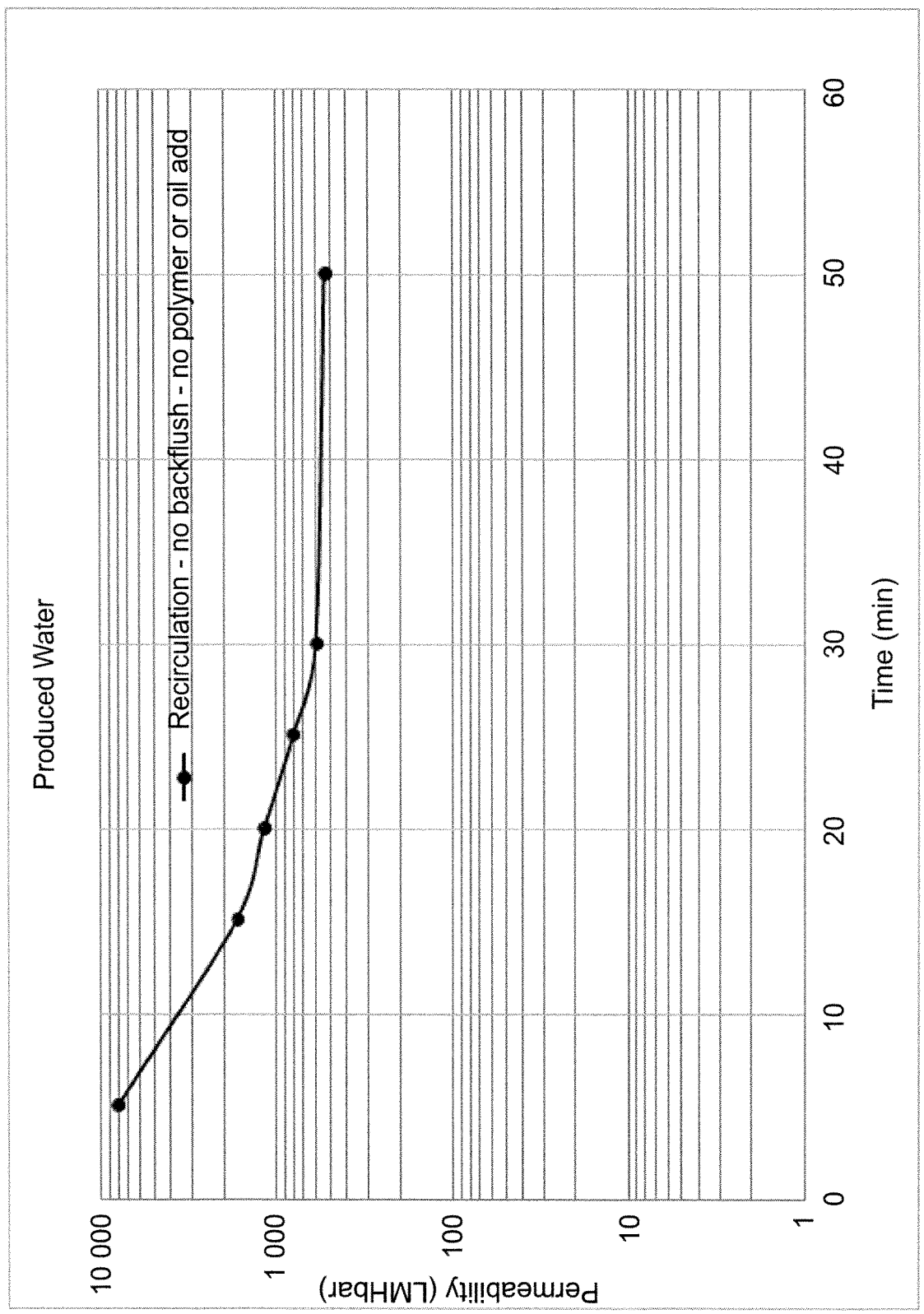

The filtration permeability over time is shown on FIG. 9.

It has been shown that the permeability is decreasing slowly during the first part of the test, while it remains stable at a lower value during the second part of the test.

Example 6—Chemical Enhanced Oil Recovery Process

A Chemical Enhanced Oil Recovery process is simulated with a coreflood system by injecting an aqueous solution comprising a poly(acrylamide-co-sodium acrylate) having a molecular weight of 15 MDa (step 1). The produced water is filtrated with a ceramic membrane according to the invention to obtain a permeate (step 2), and the permeate is used to prepare a new aqueous solution in which fresh polymer is dissolved (step 3). Finally the resulted aqueous solution is injected (step 4).

Step 1—Injection of an aqueous solution comprising a poly(acrylamide-co-sodium acrylate) (15 MDa)

A core flow injection with the following characteristics is performed:
Temperature: 50° C.
Average permeability: 1200 mD sandstone
Oil gravity: 22° API.

The aqueous solution comprising the polymer has the following composition and properties:
NaCl: 3300 mg/L
KCl: 70 mg/L
CaCl2, 2H2O: 150 mg/L
Mg,Cl2, 6H2O: 85 mg/L
Na2SO4: 30 mg/L NaHCO3: 100 mg/L
Dissolved Oxygen: 20 ppb
Total suspended solids: 5 ppm
pH: 7.5
Polymer concentration: 1000 ppm
Viscosity: 25 cP
Filter ratio: 1.1
The recovery factor is 38%.

Without the addition of 1000 ppm of polymer, the recovery factor is only 25%.

Step 2—Filtration of the produced water with a ceramic membrane according to the invention On the produced water side of the core flow, polymer is produced along with the water. The produced water comprising the polymer has the following characteristics:

NaCl: 3000-3500 mg/L
KCl: 50-100 mg/L
CaCl2, 2H2O: 120-170 mg/L
Mg,Cl2, 6H2O: 60-100 mg/L
Na2SO4: 25-40 mg/L
NaHCO3: 40-100 mg/L
Dissolved Oxygen: 20 ppb
pH: 7.5
Total suspended solids: 10-15 ppm with average size of 10 μm
Oil in water concentration: 300-700 ppm with average size of 12.5 μm
Polymer concentration: 500 ppm
Viscosity: 3.5 cP The produced water is filtrated on a uncoated SiC monolith ceramic membrane, having a membrane cut-off of from about 5 to about 10 μm, and a permeate is obtained, which has the following characteristics:

Polymer concentration: 500 ppm
NaCl: 3000-3500 mg/L
KCl: 50-100 mg/L
CaCl2, 2H2O: 120-170 mg/L
Mg,Cl2, 6H2O: 60-100 mg/L
Na2SO4: 25-40 mg/L
NaHCO3: 40-100 mg/L
Dissolved Oxygen: 20 ppb
pH: 7.5
Total suspended solids: 5 ppm with average size of 10 μm
Oil in water concentration: 5-20 ppm
Polymer concentration: 500 ppm
Viscosity: 3.5 cP The polymer initially contained in the produced water is present in the permeate and may be recycled for a new injection.

Step 3—Preparation of new viscosified aqueous solutions for injection

Two different aqueous solutions are prepared with the permeate.

New aqueous solution A is obtained by dissolving in the permeate 1000 ppm of freshly added poly(acrylamide-co-sodium acrylate) (15 MDa). The viscosity obtained is 32 cP and the Filter ration is 1.1

New aqueous solution B is obtained by dissolving in the permeate 700 ppm of freshly added poly(acrylamide-co-sodium acrylate) (15 MDa). The viscosity obtained is 25 cP and the Filter ratio is 1.1

Step 4—Injection of new viscosified aqueous solution A and B

The same coreflow of step 1 is made with new viscosified aqueous solutions A and B. The following recovery factors are obtained.

|  | new viscosified aqueous solution A | new viscosified aqueous solution B |
| --- | --- | --- |
| Recovery factor | 43% | 38% |

The process of the invention has the advantage to recycle a part of the polymer for new injection. One may reduce the polymer consumption (1000 ppm to 700 ppm) to obtain the same recovery factor, or one may increase the recovery factor (38% to 43%) while maintaining the same polymer consumption (1000 ppm).

The invention claimed is:

1. A method of recovering oil from an oil-bearing formation using viscosity-increasing polymeric compounds comprising:
   recovering an oil-water mixture from the oil-bearing formation;
   separating oil from the oil-water mixture to produce an oil product and produced water wherein the produced water contains suspended solids, free oil, emulsified oil and about 50 to about 5000 ppm of the viscosity-increasing polymeric compounds, and wherein the viscosity-increasing polymeric compounds have a molecular weight that ranges from about 1 to about 30 MDa;
   separating the viscosity-increasing polymeric compounds in the produced water from the suspended solids, free oil and emulsified oil; and
   wherein separating the viscosity-increasing polymeric compounds comprises directing the produced water to a microfiltration ceramic membrane having a cut-off from about 2 μm to about 9 μm and filtering the produced water in the ceramic membrane to produce a permeate having at least some of the viscosity-increasing polymeric compounds and a reject having the suspended solids, free oil and emulsified oil and wherein the permeate is substantially free of suspended solids, free oil and emulsified oil.

2. The method of claim 1 further including recycling the viscosity-increasing polymeric compounds by injecting the permeate containing the viscosity-increasing polymeric compounds into the oil-bearing formation.

3. The method of claim 2 including continuously or intermittently producing permeate containing at least some of the viscosity-increasing polymeric compounds and recycling the viscosity-increasing polymeric compounds into the oil-bearing formation.

4. The method of claim 2 wherein prior to the permeate being injected into the oil-bearing formation, adding one or more compounds to the permeate selected from the group consisting of surfactants, solvents, alkaline compounds, stabilizing agents, and mixtures thereof.

5. The method of claim 2 including directly injecting the permeate containing at least some of the viscosity-increasing polymeric compounds into the oil-bearing formation or enhancing the permeate by mixing a fresh aqueous solution containing additional viscosity-increasing polymeric compounds and injecting the enhanced permeate into the oil-bearing formation.

6. The method of claim 2 including diluting the permeate produced by the ceramic membrane with water prior to the permeate being injected into the oil-bearing formation.

7. The method of claim 2 further comprising:
   wherein by injecting the permeate into the oil-bearing formation, at least some of the viscosity-increasing polymeric compounds used in the recovery of oil is recycled via the permeate produced by the ceramic membrane;

mixing an aqueous solution containing additional viscosity-increasing polymeric compounds with the viscosity-increasing polymeric compounds in the permeate;

wherein the viscosity-increasing polymeric compounds is a water-soluble polymer selected from the group consisting of natural water-soluble polymers, semi-synthetic water-soluble polymers, synthetic water-soluble polymers, or mixtures thereof; and partially accumulating emulsified oil in the ceramic membrane and wherein the partially accumulated emulsified oil forms a filtering layer in the ceramic membrane which facilitates the separation of the viscosity-increasing polymeric compounds from the suspended solids, free oil and emulsified oil.

8. The method of claim 2 further comprising:

wherein by injecting the permeate into the oil-bearing formation, at least some of the viscosity-increasing polymeric compounds used in the recovery of oil is recycled via the permeate produced by the ceramic membrane;

partially accumulating emulsified oil in the ceramic membrane and wherein the partially accumulated emulsified oil forms a filtering layer in the ceramic membrane which facilitates the separation of the viscosity-increasing polymeric compounds from the suspended solids, free oil and emulsified oil; and diluting the permeate produced by the ceramic membrane with water prior to the permeate being injected into the oil-bearing formation.

9. The method of claim 1 including mixing an aqueous solution containing additional viscosity-increasing polymeric compounds with the viscosity-increasing polymeric compounds in the permeate.

10. The method of claim 1 wherein the viscosity-increasing polymeric compounds is a water-soluble polymer selected from the group consisting of natural water-soluble polymers, semi-synthetic water-soluble polymers, synthetic water-soluble polymers, or mixtures thereof.

11. The method of claim 1 wherein the viscosity-increasing polymeric compounds is obtained by polymerization of non-ionic monomers anionic monomers, cationic monomers, or monomers having a hydrophobic character.

12. The method of claim 1 wherein the viscosity-increasing polymeric compounds is selected from the group consisting of non-ionic polymeric compounds, anionic polymeric compounds, or mixtures therefore.

13. The method of claim 1 wherein the permeate from the ceramic membrane contains 20 ppm or less of emulsified oil.

14. The method of claim 1 including partially accumulating emulsified oil in the ceramic membrane and wherein the partially accumulated emulsified oil forms a filtering layer in the ceramic membrane which facilitates the separation of the viscosity-increasing polymeric compounds from the suspended solids, free oil and emulsified oil.

15. A treatment process of produced water, obtained from a method using viscosity-increasing polymeric compounds, the treatment process comprising the steps of:

obtaining an oil-water mixture from an oil-bearing formation;

treating the oil-water mixture by separating oil from the oil-water mixture which yields the produced water and wherein the produced water contains about 50 to about 5000 ppm of the viscosity-increasing polymeric compounds and wherein the viscosity-increasing polymeric compounds have a molecular weight that ranges from about 1 to about 30 MDa; and directing the produced water containing the viscosity-increasing polymeric compounds into a microfiltration ceramic membrane unit having a cut-off of from about 2 μm to about 8 μm, and wherein the ceramic membrane unit produces a permeate containing the viscosity-increasing polymeric compound, and wherein the permeate is substantially free of suspended solids, free oil and emulsified oil.

16. The treatment process of claim 15, wherein the oil-water mixture is obtained from a chemically enhanced oil recovery method using viscosity-increasing polymeric compounds.

17. The treatment process of claim 15, wherein the produced water is subjected to ceramic membrane filtration at a pressure of from about $0.5 \times 10^5$ to about $5 \times 10^5$ Pa.

18. The treatment process of claim 15, wherein the produced water is subjected to ceramic membrane filtration at a temperature of from about 25° C. to about 110° C.

19. The treatment process of claim 15, wherein the ceramic membrane filtration is carried out under a continuous feed.

20. The treatment process of claim 15, wherein the microfiltration ceramic membrane is backwashed at regular intervals during the ceramic membrane filtration step.

21. The treatment process of claim 15, wherein the ceramic membrane filtration unit comprises a structure of at least one monolith segment of porous material, and a porous membrane.

22. The treatment process of claim 15, wherein the ceramic membrane filtration unit is contained in a housing.

23. The treatment process of claim 15, wherein the viscosity-increasing polymeric compound is a water-soluble polymer selected from the group consisting of natural water-soluble polymers, semi-synthetic water-soluble polymers, synthetic water-soluble polymers, or mixtures thereof.

24. The treatment process of claim 15, wherein the viscosity-increasing polymeric compound is obtained by polymerization of non-ionic monomers anionic monomers, cationic monomers, or monomers having a hydrophobic character.

25. The treatment process of claim 15, wherein the viscosity-increasing polymeric compound is selected from the group consisting of non-ionic polymeric compounds, anionic polymeric compounds, or mixtures therefore.

26. The treatment process of claim 15, further comprising the step of diluting the permeate with an aqueous media.

27. The treatment process of claim 15, further including adding compounds to the permeate and wherein the compounds added to the permeate are selected from the group consisting of additional viscosity-increasing polymeric compounds, surfactants, alkaline compounds, stabilizing agents and mixtures thereof.

* * * * *